(12) United States Patent
Cao et al.

(10) Patent No.: US 12,126,911 B2
(45) Date of Patent: Oct. 22, 2024

(54) OMNIDIRECTIONAL GHOST IMAGING METHOD AND SYSTEM BASED ON THE MECHANISM OF BIO-INSPIRED RETINA-LIKE

(71) Applicant: Beijing Institute of Technology, Beijing (CN)

(72) Inventors: Jie Cao, Beijing (CN); Qun Hao, Beijing (CN); Huan Cui, Beijing (CN); Yingqiang Zhang, Beijing (CN)

(73) Assignee: Beijing Institute of Technology, Beijing (CN)

( * ) Notice: Subject to any disclaimer, the term of this patent is extended or adjusted under 35 U.S.C. 154(b) by 302 days.

(21) Appl. No.: 17/726,293

(22) Filed: Apr. 21, 2022

(65) Prior Publication Data
US 2022/0400203 A1    Dec. 15, 2022

(30) Foreign Application Priority Data
Jun. 15, 2021 (CN) .......................... 202110670824.X

(51) Int. Cl.
*H04N 5/232* (2006.01)
*G02B 5/02* (2006.01)
(Continued)

(52) U.S. Cl.
CPC ......... *H04N 23/698* (2023.01); *G02B 5/0284* (2013.01); *H04N 23/56* (2023.01)

(58) Field of Classification Search
CPC ........ G06T 3/12; G02B 5/0284; H04N 23/55; H04N 23/56; H04N 23/698
See application file for complete search history.

(56) References Cited

U.S. PATENT DOCUMENTS

| 7,038,789 B1 * | 5/2006 | Carrieri | G01J 3/2823 356/491 |
| 2012/0327287 A1 * | 12/2012 | Meyers | G01B 11/24 348/335 |

(Continued)

FOREIGN PATENT DOCUMENTS

| CN | 101655347 A | * | 2/2010 | |
| CN | 109343078 A | * | 2/2019 | |
| CN | 108303039 B | * | 6/2019 | G01B 11/25 |

OTHER PUBLICATIONS

"Modeling and Simulations of Retina-Like Three-Dimensional Computational Ghost Imaging"—Zhang et al.; IEEE Photonics Journal; vol. 11, No. 1, Feb. 2019 (Year: 2019).*

(Continued)

*Primary Examiner* — Mainul Hasan
(74) *Attorney, Agent, or Firm* — Westbridge IP LLC

(57) ABSTRACT

An omnidirectional ghost imaging system based on a mechanism of bio-inspired retina-like includes a projection system, a collimating lens, a spectroscope, a curved mirror, a bucket detector, a data acquisition card and an arithmetic system. According to the application, the logarithmic polar mapping characteristic of the bio-inspired retina-like structure is utilized to generate an annular pattern sequence of the bio-inspired retina-like, and the pattern sequence is utilized to modulate a light source. After being reflected by the target around the curved mirror, the light is projected onto the curved mirror and diffusely reflected. According to the reversible characteristics of the optical path, the light after diffuse reflection is reflected to the original light source by the half mirror and half lens, and the reflected light intensity with target information is received by the bucket detector.

4 Claims, 6 Drawing Sheets

(51) Int. Cl.
  *H04N 5/225*   (2006.01)
  *H04N 23/56*   (2023.01)
  *H04N 23/698*  (2023.01)

(56) References Cited

U.S. PATENT DOCUMENTS

2016/0041390 A1* 2/2016 Poon .................... G02B 5/3083
                                              359/489.08
2018/0220070 A1* 8/2018 Bagnato ............... H04N 23/661

OTHER PUBLICATIONS

"Hyperspectral Computational Ghost Imaging via Temporal Multiplexing"—Wang et al., IEEE Photonics Technology Letters, vol. 28, No. 3, Feb. 1, 2016 (Year: 2016).*

* cited by examiner

OMNIDIRECTIONAL GHOST IMAGING METHOD AND SYSTEM BASED ON THE MECHANISM OF BIO-INSPIRED RETINA-LIKE

CROSS-REFERENCE TO RELATED APPLICATIONS

This application claims priority to Chinese Patent Application No. 202110670824.X, filed on Jun. 15, 2021, the contents of which are hereby incorporated by reference.

TECHNICAL FIELD

The application belongs to the field of photoelectric imaging, and in particular relates to an omnidirectional ghost imaging method based on the mechanism of bio-inspired retina-like.

BACKGROUND

A ghost imaging is a new imaging method, which uses a bucket detector to collect the light intensity fluctuation reflected or transmitted after the modulated light source illuminates the target, and then carries out correlation calculation with the modulated light source to reconstruct the target image. Compared with conventional imaging methods, the ghost imaging has the advantages of a simple structure, a strong anti-interference ability, an imaging resolution exceeding diffraction limit, and being able to image in different wave bands and high detection sensitivity. It can be used to solve the problems and challenges encountered by conventional imaging technologies, and has been extensively applied in a three-dimensional imaging, a microscopic imaging, a multispectral imaging, a remote sensing and other fields.

In practical application, an imaging technology has three important requirements: a high resolution, a large field of view and a real-time feature. At present, most of the research on ghost imaging focus on the improvement of an imaging quality and an imaging speed, so as to help to solve the problems and cope with challenges encountered by a conventional high-resolution imaging and real-time imaging. However, there are few research achievements on the ghost imaging with a large field of view, and as far as it is known, there is no research on a panoramic ghost imaging. However, there are many problems and challenges in the existing conventional panoramic imaging technology, such as the high cost of imaging in the non-visible light band, and the difficulty of imaging in some harsh imaging environments, such as an atmospheric turbulence and a scattering media, etc. With the help of the imaging advantages of the ghost imaging, such as a strong anti-interference ability and an ability of imaging in different wave bands, these problems can be solved. Therefore, it is urgent to propose a new panoramic imaging method by using the advantages of ghost imaging.

SUMMARY

In order to solve the problems and cope with challenges existing in the conventional panoramic imaging technology, the technical problems to be solved by the method and the system of panoramic ghost imaging based on the mechanism of bio-inspired retina-like disclosed by the application are: realizing 360-degree panoramic ghost imaging based on ghost imaging mechanism combined with catadioptric panoramic imaging method, and realizing undistorted high-quality panoramic ghost imaging based on logarithmic polar mapping mechanism of bio-inspired retina-like.

The objective of the application is achieved by the following technical scheme:

an omnidirectional ghost imaging method based on the mechanism of bio-inspired retina-like proposed by the application utilizes the logarithmic polar mapping characteristic of the bio-inspired retina-like structure to generate an annular pattern sequence of the bio-inspired retina-like, and utilizes the pattern sequence to modulate a light source and the modulated light illuminates curved minor. After being reflected by the target around the curved minor, the light is projected onto the curved minor and diffusely reflected. According to the reversible characteristics of the optical path, the light after diffuse reflection is reflected to the original light source by the half minor and half lens, and the reflected light intensity with target information is received by the bucket detector. The reflected light intensity measurement value with target information is correlated with the annular pattern sequence of bio-inspired retina-like used for modulating the light source, and a 360-degree omnidirectional image is reconstructed, that is, realizing 360-degree omnidirectional ghost imaging. According to the mapping characteristics of logarithmic polar coordinates of bio-inspired retina-like, the reconstructed image is transformed into logarithmic polar coordinates, the image after logarithmic polar coordinates transformation is 360-degree tiled image and the tiled and undistorted high-quality panoramic ghost imaging is obtained.

The application discloses an omnidirectional ghost imaging method based on the mechanism of bio-inspired retina-like, which comprises the following steps:

S1: generating an annular pattern sequence of bio-inspired retina-like by utilizing the logarithmic polar coordinate mapping characteristics of bio-inspired retina-like structure.

S1.1: initializing the parameters used for generating the annular pattern of bio-inspired retina-like.

The annular pattern of bio-inspired retina-like includes the blind area of the central fovea and the imaging area, so area within the radius $r_0$ of the outer ring of the blind area of the central fovea is defined as a blind area, and the area outside the radius $r_0$ is defined as an imaging area. According to the difference of polar diameter and polar angle, the imaging area is divided into P rings, each ring has Q pixels, and E denotes the inter-ring growth coefficient.

S1.2: constructing an annular pattern model of bio-inspired retina-like, and generating an annular pattern sequence of bio-inspired retina-like.

According to the parameters set in S1.1, a model of the annular pattern of bio-inspired retina-like is obtained as follows:

$$\begin{cases} r_p = r_1 \cdot \varepsilon^{p-1} \\ \varepsilon = \dfrac{1+\sin(\pi/Q)}{1-\sin(\pi/Q)} \\ r_1 = \dfrac{r_0}{1-\sin(\pi/Q)} \\ \theta_q = q \cdot \dfrac{2\pi}{Q} \quad (q=1,2,3 \ldots Q) \\ \xi_p = \log_\varepsilon(r_p) = \log_\varepsilon(r_1) + p - 1 \quad (p=1,2,3 \ldots P) \end{cases} \quad (1)$$

in which p and q represent the p-th ring and the q-th pixel respectively, $r_p$ represents the radius of the p-th ring of pattern, and $\theta_q$ is the angle corresponding to the q-th pixel.

Each pixel grid is filled with a pattern for modulating the light source, so as to generate the annular pattern sequence of bio-inspired retina-like.

S2: utilizing the annular pattern sequence of bio-inspired retina-like to modulate a light source and the modulated light illuminates curved mirror. After being reflected by the target around the curved mirror, the light is projected onto the curved mirror and diffusely reflected. According to the reversible characteristics of the optical path, the light after diffuse reflection is reflected to the original light source by the half mirror and half lens, and the reflected light intensity with target information is received by the bucket detector. The reflected light intensity measurement value with target information is correlated with the annular pattern sequence of bio-inspired retina-like used to modulate the light source, and the 360-degree omnidirectional image is reconstructed, that is, 360-degree omnidirectional ghost imaging.

S2.1: modulating the light source by utilizing the annular pattern sequence of bio-inspired retina-like, and making the modulated light illuminate the curved mirror so as to completely cover the entire imaging field of view. The light is reflected by the target around the curved mirror, then projected onto the curved mirror and diffusely reflected. According to the reversible characteristics of the optical path, the light after diffuse reflection is reflected to the original light source by the half mirror and half lens, and the reflected light intensity with target information is received by a bucket detector.

S2.2: correlating the reflected light intensity measurement value with target information with the annular pattern sequence of bio-inspired retina-like for modulating the light source, and reconstructing the 360-degree omnidirectional image, namely, 360-degree omnidirectional ghost imaging.

The image resolution is set to M×N, and M×N pieces of annular pattern sequences bio-inspired retina-like is projected. The measured values detected by the detector are $y=\{y_1, y_2 \ldots y_{M \times N}\}$, and the reconstructed 360-degree omnidirectional image is $o(x,y)$ as follows:

$$o(x, y) = \frac{1}{M \times N} \sum_{i=1}^{M \times N} y_i k_i, \quad (2)$$

in which, $k_i$ represents the projected i-th pattern, and $y_i$ represents the measured light intensity obtained by projecting the i-th pattern.

The reflected light intensity measurement value with target information and the annular pattern sequence of the bio-inspired retina-like used for modulating the light source are correlated and calculated according to the reconstruction algorithm shown in formula (2), so that the 360-degree omnidirectional image is reconstructed, that is, 360-degree omnidirectional ghost imaging.

S3: according to the mapping characteristics of logarithmic polar coordinates of bio-inspired retina-like, transforming the reconstructed image into logarithmic polar coordinates and obtaining 360-degree tiled image after the reconstructed image is transformed into logarithmic polar coordinates, thus obtaining the tiled and undistorted high-quality panoramic ghost imaging. Step S3 comprises the following steps:

converting the 360-degree omnidirectional image reconstructed in S2 from Cartesian coordinates to polar coordinates;

where the coordinate of a certain point in Cartesian coordinates is defined as (x,y), denoted as (r,α) in polar coordinates, which is calculated out by Cartesian coordinates as follows:

$$\begin{cases} r = \sqrt{x^2 + y^2} \\ \alpha = \arctan(y/x) \end{cases}, \quad (3)$$

where r and α are the polar diameter and polar angle of polar coordinate; and transforming the reconstructed image into logarithmic polar coordinates and obtaining 360-degree tiled image after the reconstructed image is transformed into logarithmic polar coordinates, thus obtaining the tiled and undistorted high-quality panoramic ghost imaging.

The logarithmic polar coordinate described in S3.2 essentially takes logarithm of the polar diameter r, that is $$\begin{cases} \rho = \log_\varepsilon(r) = \log_\varepsilon\left(\sqrt{x^2 + y^2}\right) \\ \theta = \arctan(y/x) \end{cases}, \quad (4)$$

where p and θ are the median radius and angle of logarithmic polar coordinates, and the base is the inter-ring growth coefficient ε.

The application also discloses an omnidirectional ghost imaging system based on the mechanism of bio-inspired retina-like, which is intended for realizing the omnidirectional ghost imaging system based on the mechanism of bio-inspired retina-like. The system comprises a projection system, a collimating lens, a spectroscope, a curved mirror, a bucket detector, a data acquisition card and an arithmetic system.

The projection system, the collimating lens, the spectroscope and the curved mirror are located on the same optical path in sequence, and the light source of the projection system is modulated by the annular pattern sequence of bio-inspired retina-like, collimated by the collimating lens, and then projected onto the curved mirror through the spectroscope; the light intensity reflected from the mirror is reflected by the spectroscope, received by the bucket detector, and stored in the data acquisition card to collect the total light intensity information of the whole omnidirectional target. The arithmetic system is used to reconstruct the 360-degree omnidirectional image and perform data operation and processing of logarithmic polar coordinate transformation on the 360-degree omnidirectional image.

The application also discloses a working method of an omnidirectional ghost imaging system based on the mechanism of bio-inspired retina-like, which comprises the following steps:

the required annular pattern sequence of bio-inspired retina-like according to S1 is input into the projection system, and the light source of the projection system is modulated. The modulated light source is collimated by the collimating lens, and then projected onto the curved mirror by the spectroscope. The light intensity reflected from the omnidirectional image projected on the surface of the mirror is reflected by the spectroscope, and received by the bucket detector, and the data acquisition card stores the data. After repeated measurements, correlation calculation is performed according to the reconstruction algorithm of S2, and a 360-degree omnidirectional image is reconstructed. According to S3, the 360-degree omnidirectional image is converted into logarithmic polar coordinates, and the image is tiled and unfolded, thus obtaining the undistorted 360-degree omnidirectional ghost imaging target.

Beneficial Effects:

1. The application discloses an omnidirectional ghost imaging method and system based on the mechanism of bio-inspired retina-like. Based on the mechanism of ghost imaging, combined with catadioptric panoramic imaging method, 360-degree ghost imaging can be realised. Only one curved mirror is needed to expand the imaging field of ghost imaging, without rotating and splicing, so structure is simple. It can realize ghost imaging with large field of view, high quality and high speed at the same time, thus meeting the imaging requirements of more fields and expanding the application field of ghost imaging.

2. The application discloses an omnidirectional ghost imaging method and system based on the mechanism of bio-inspired retina-like. Based on the logarithmic polar mapping mechanism of bio-inspired retina-like, the annular 360-degree reconstructed image is tiled flat without distortion, so as to realize high-quality panoramic ghost imaging without distortion, improve the quality of panoramic imaging and expand the application of panoramic imaging in various fields.

BRIEF DESCRIPTION OF THE DRAWINGS

FIG. 1 is a schematic diagram of the annular pattern of the bio-inspired retina-like, in which: (a) is an enlarged detail of the imaging area, (b) is pattern structure of the bio-inspired retina-like including the central fovea blind area and the imaging area, (c) is a pattern structure after log-polar coordinate transformation, and (d) is a generated concrete pattern of the bio-inspired retina-like.

FIG. 2 is the structural diagram of the omnidirectional ghost imaging system based on the mechanism of the bio-inspired retina-like.

FIG. 3 illustrates a flow chart of the omnidirectional ghost imaging method based on the mechanism of bio-inspired retina-like.

FIG. 4 illustrates a flow chart of the omnidirectional ghost imaging method based on the mechanism of bio-inspired retina-like.

FIG. 5(a) and FIG. 5(b) show annular 360-degree reconstructed image of target and tiled image, in which FIG. 5(a) shows the annular 360-degree reconstructed image and FIG. 5(b) shows the tiled image of annular 360-degree reconstructed image.

DETAILED DESCRIPTION OF THE EMBODIMENTS

In order to better explain the objectives and advantages of the present application, the content of the application will be further explained below with reference to the drawings and embodiments.

Figure 3:
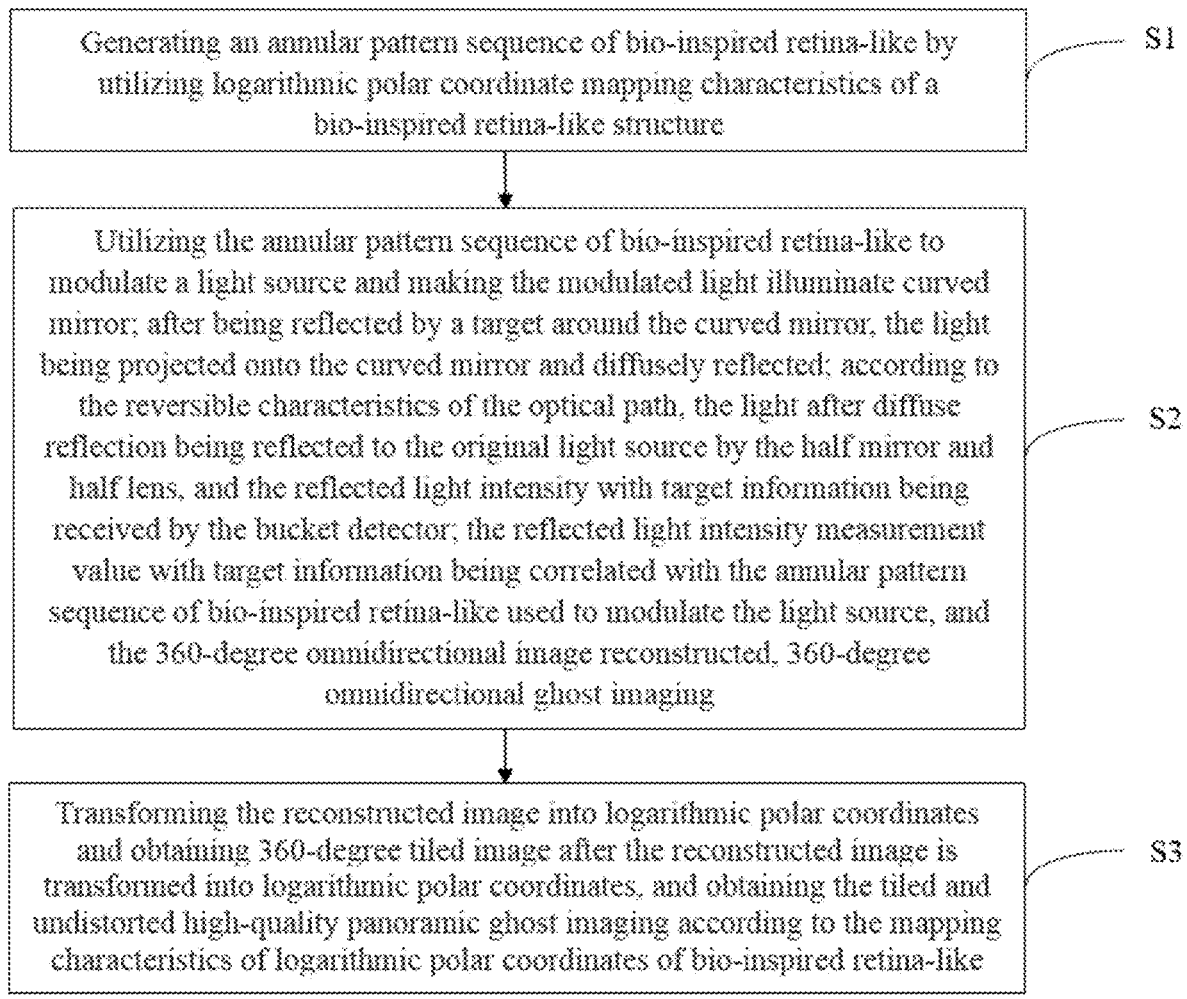

As shown in FIG. 3, the application discloses an omnidirectional ghost imaging method based on the mechanism of bio-inspired retina-like, which comprises the following steps:

S1: generating an annular pattern sequence of bio-inspired retina-like by utilizing the logarithmic polar coordinate mapping characteristics of bio-inspired retina-like structure.

S1.1: initializing the parameters used for generating the annular pattern of bio-inspired retina-like.

The annular pattern of bio-inspired retina-like includes the blind area of the central fovea and the imaging area, so area within the radius $r_0$ of the outer ring of the blind area of the central fovea is defined as a blind area, and the area outside the radius $r_0$ is defined as an imaging area. According to the difference of polar diameter and polar angle, the imaging area is divided into P rings, each ring has Q pixels, and E denotes the inter-ring growth coefficient.

S1.2: constructing an annular pattern model of bio-inspired retina-like, and generating an annular pattern sequence of bio-inspired retina-like.

According to the parameters set in S1.1, a model of the annular pattern of bio-inspired retina-like is obtained as follows:

$$\begin{cases} r_p = r_1 \cdot \varepsilon^{p-1} \\ \varepsilon = \dfrac{1+\sin(\pi/Q)}{1-\sin(\pi/Q)} \\ r_1 = \dfrac{r_0}{1-\sin(\pi/Q)} \\ \theta_q = q \cdot \dfrac{2\pi}{Q} \quad (q=1,2,3 \ldots Q) \\ \xi_p = \log_\varepsilon(r_p) = \log_\varepsilon(r_1) + p - 1 \quad (p=1,2,3 \ldots P) \end{cases} \quad (1)$$

in which p and q represent the p-th ring and the q-th pixel respectively, $r_p$ represents the radius of the p-th ring of pattern, and $\theta_q$ is the angle corresponding to the q-th pixel.

Each pixel grid is filled with a pattern for modulating the light source, so as to generate the annular pattern sequence of bio-inspired retina-like.

S2: utilizing the annular pattern sequence of bio-inspired retina-like to modulate a light source and the modulated light illuminates curved mirror. After being reflected by the target around the curved mirror, the light is projected onto the curved mirror and diffusely reflected. According to the reversible characteristics of the optical path, the light after diffuse reflection is reflected to the original light source by the half mirror and half lens, and the reflected light intensity with target information is received by the bucket detector. The reflected light intensity measurement value with target information is correlated with the annular pattern sequence of bio-inspired retina-like used to modulate the light source, and the 360-degree omnidirectional image is reconstructed, that is, 360-degree omnidirectional ghost imaging.

S2.1: modulating the light source by utilizing the annular pattern sequence of bio-inspired retina-like, and making the modulated light illuminate the curved mirror so as to completely cover the entire imaging field of view. The light is reflected by the target around the curved mirror, then projected onto the curved mirror and diffusely reflected. According to the reversible characteristics of the optical path, the light after diffuse reflection is reflected to the original light source by the half mirror and half lens, and the reflected light intensity with target information is received by a bucket detector.

S2.2: correlating the reflected light intensity measurement value with target information with the annular pattern sequence of bio-inspired retina-like for modulating the light source, and reconstructing the 360-degree omnidirectional image, namely, 360-degree omnidirectional ghost imaging.

The image resolution is set to M×N, and M×N pieces of annular pattern sequences bio-inspired retina-like is projected. The measured values detected by the detector are $y=\{y_1, y_2 \ldots y_{M\times N}\}$, and the reconstructed 360-degree omnidirectional image is o(x,y) as follows:

$$o(x, y) = \frac{1}{M \times N} \sum_{i=1}^{M \times N} y_i k_i, \quad (2)$$

in which, $k_i$ represents the projected i-th pattern, and $y_i$ represents the measured light intensity obtained by projecting the i-th pattern.

The reflected light intensity measurement value with target information and the annular pattern sequence of the bio-inspired retina-like used for modulating the light source are correlated and calculated according to the reconstruction algorithm shown in formula (2), so that the 360-degree omnidirectional image is reconstructed, that is, 360-degree omnidirectional ghost imaging.

S3: according to the mapping characteristics of logarithmic polar coordinates of bio-inspired retina-like, transforming the reconstructed image into logarithmic polar coordinates and obtaining 360-degree tiled image after the reconstructed image is transformed into logarithmic polar coordinates, thus obtaining the tiled and undistorted high-quality panoramic ghost imaging. Step S3 comprises the following steps:

converting the 360-degree omnidirectional image reconstructed in S2 from Cartesian coordinates to polar coordinates;

where the coordinate of a certain point in Cartesian coordinates is defined as (x,y), denoted as (r,α) in polar coordinates, which is calculated out by Cartesian coordinates as follows:

$$\begin{cases} r = \sqrt{x^2 + y^2} \\ \alpha = \arctan(y/x) \end{cases}, \quad (3)$$

where r and α are the polar diameter and polar angle of polar coordinate; and transforming the reconstructed image into logarithmic polar coordinates and obtaining 360-degree tiled image after the reconstructed image is transformed into logarithmic polar coordinates, thus obtaining the tiled and undistorted high-quality panoramic ghost imaging.

The logarithmic polar coordinate described in S3.2 essentially takes logarithm of the polar diameter r, that is $$\begin{cases} \rho = \log_\varepsilon(r) = \log_\varepsilon\left(\sqrt{x^2 + y^2}\right) \\ \theta = \arctan(y/x) \end{cases}, \quad (4)$$

where ρ and θ are the median radius and angle of logarithmic polar coordinates, and the base is the inter-ring growth coefficient E.

Embodiment 1

Figure 2:
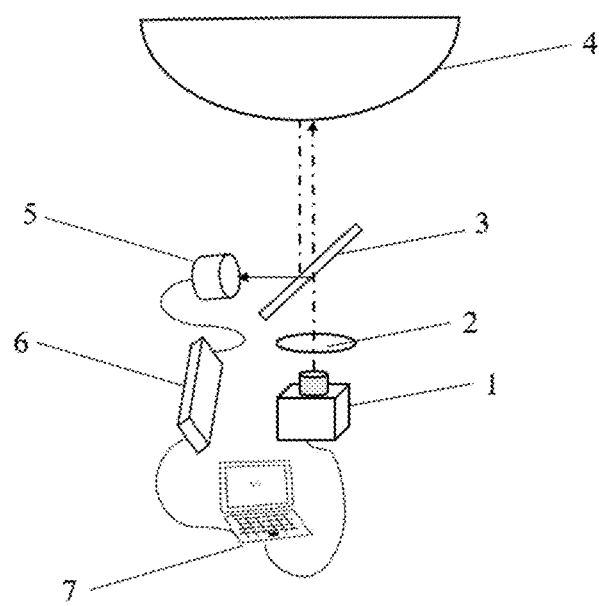
Figure 4:
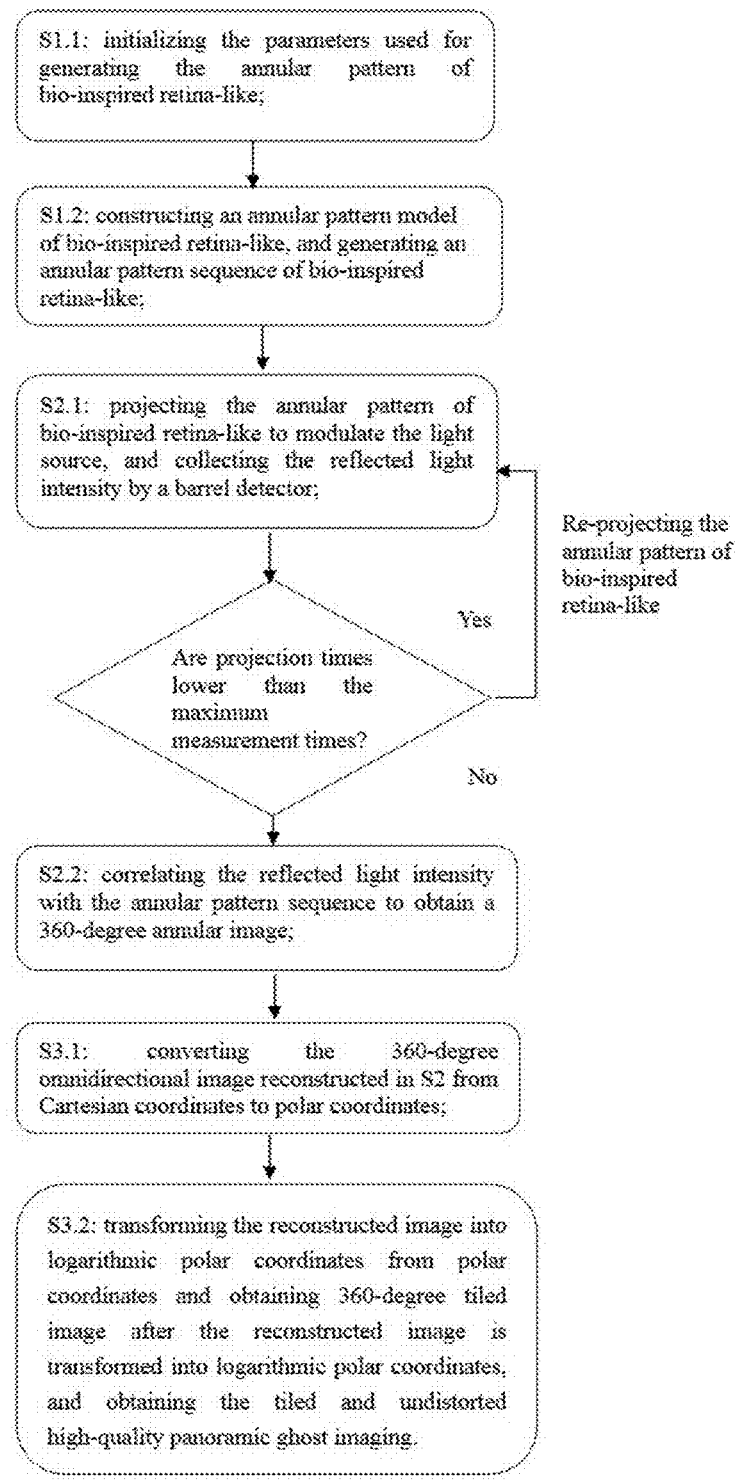

As shown in FIG. 4, this embodiment discloses the omnidirectional ghost imaging method. The applied system structure is shown in FIG. 2, and the concrete implementation includes the following steps.

S1: generating an annular pattern sequence of bio-inspired retina-like by utilizing the logarithmic polar coordinate mapping characteristics of bio-inspired retina-like structure.

S1.1: initializing the parameters used for generating the annular pattern of bio-inspired retina-like.

Figure 1:
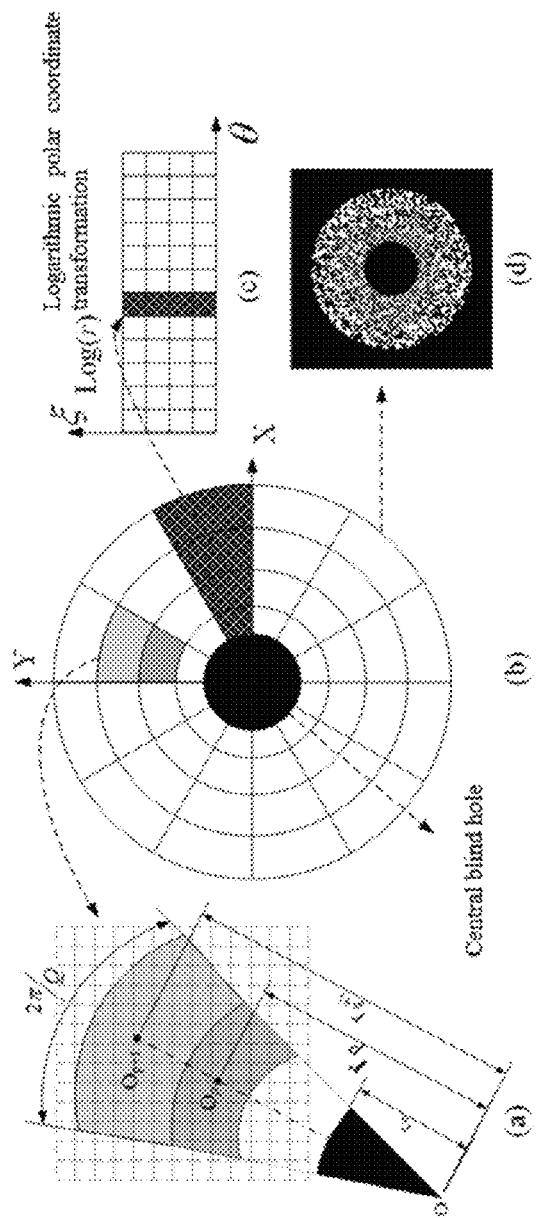

According to the structure of the annular pattern of bio-inspired retina-like as shown in (b) of FIG. 1, the annular pattern of bio-inspired retina-like is divided into the blind hole area of the central fovea and the imaging area outside the blind hole area of the central fovea, and the radius $r_0$ of the outer ring of the blind hole area of the central fovea is defined as 12 pixels. According to the difference of polar diameter and polar angle, the imaging area is divided into 20 rings, each ring has 90 pixels, and the inter-ring growth coefficient is 1.0012.

S1.2: constructing an annular pattern model of bio-inspired retina-like, and generating an annular pattern sequence of bio-inspired retina-like.

According to the parameters set in S1.1, the annular pattern model of bio-inspired retina-like is obtained as follows:

$$\begin{cases} r_p = r_1 \cdot 1.0012^{p-1} \\ r_1 = \dfrac{12}{1 - \sin(\pi/90)} \\ \theta_q = q \cdot \dfrac{2\pi}{90} \quad (q = 1, 2, 3 \ldots 90) \\ \xi_p = \log_{1.0012}(r_p) = \log_{1.0012}(r_1) + p - 1 \quad (p = 1, 2, 3 \ldots 20) \end{cases}, \quad (5)$$

in which p and q represent the p-th ring and the q-th pixel respectively, $r_p$ represents the radius of the p-th ring of pattern, $\theta_q$ is the angle corresponding to the q-th pixel, and $\xi_p$ is the length corresponding to the radius of the p-th ring in logarithmic polar coordinate system.

Each pixel grid is filled with a pattern for modulating the light source as shown in (a) of FIG. 1, so that it has the annular characteristics of bio-inspired retina-like, and the annular pattern sequence of bio-inspired retina-like is generated, for example, as shown in (d) of FIG. 1.

S2: utilizing the annular pattern sequence of bio-inspired retina-like to modulate a light source and the modulated light illuminates curved mirror. After being reflected by the target around the curved mirror, the light is projected onto the curved mirror and diffusely reflected. According to the reversible characteristics of the optical path, the light after diffuse reflection is reflected to the original light source by the half mirror and half lens, and the reflected light intensity with target information is received by the bucket detector. The reflected light intensity measurement value with target information is correlated with the annular pattern sequence of bio-inspired retina-like used to modulate the light source, and the 360-degree omnidirectional image is reconstructed, that is, 360-degree omnidirectional ghost imaging.

S2.1: modulating the light source by utilizing the annular pattern sequence of bio-inspired retina-like, and making the modulated light illuminate the curved mirror so as to completely cover the entire imaging field of view. The light is reflected by the target around the curved mirror, then projected onto the curved mirror and diffusely reflected. According to the reversible characteristics of the optical path, the light after diffuse reflection is reflected to the original light source by the half mirror and half lens, and the reflected light intensity with target information is received by the bucket detector.

S2.2: correlating the reflected light intensity measurement value with target information with the annular pattern sequence of bio-inspired retina-like used for modulating the light source, and reconstructing a 360-degree omnidirectional image, that is, realizing 360-degree omnidirectional ghost imaging.

The image resolution is set to 256×256, and 256×256 pieces of annular pattern sequences bio-inspired retina-like is projected. The measured values detected by the detector are y={$y_1$, $y_2$ ... $y_{256\times256}$}, and the reconstructed 360-degree omnidirectional image is o(x,y) as follows:

$$o(x, y) = \frac{1}{256 \times 256} \sum_{i=1}^{256 \times 256} y_i k_i, \quad (6)$$

in which, $k_i$ represents the projected i-th pattern, and $y_i$ represents the measured light intensity obtained by projecting the i-th pattern.

Figure 5A:
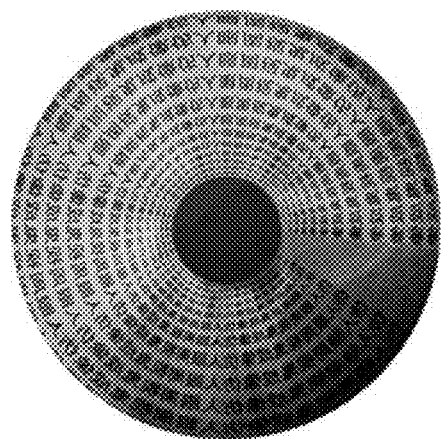

The reflected light intensity measurement value with target information and the annular pattern sequence of the bio-inspired retina-like used for modulating the light source are correlated and calculated according to the reconstruction algorithm shown in formula (2), so that the 360-degree omnidirectional image as shown in FIG. 5(a) is reconstructed, that is, 360-degree omnidirectional ghost imaging.

Figure 5B:
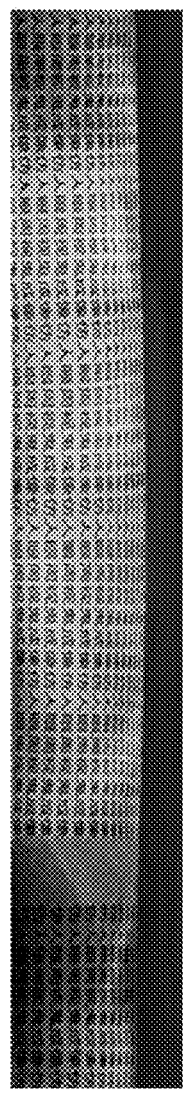

S3: according to the mapping characteristics of logarithmic polar coordinates of bio-inspired retina-like, in combination with the pattern shown in (c) of FIG. 1 where its original annular shape is transformed into the rectangle in logarithmic polar coordinates, transforming the reconstructed image into logarithmic polar coordinates and obtaining 360-degree tiled image after the reconstructed image is transformed into logarithmic polar coordinates, thus obtaining the tiled and undistorted high-quality panoramic ghost imaging. Step S3 comprises the following steps.

converting the 360-degree omnidirectional image reconstructed in S2 from Cartesian coordinates to polar coordinates;

where the coordinate of a certain point in Cartesian coordinates is defined as (x,y), denoted as (r,α) in polar coordinates, which is calculated out by Cartesian coordinates as follows:

$$\begin{cases} r = \sqrt{x^2 + y^2} \\ \alpha = \arctan(y/x) \end{cases}, \quad (7)$$

where r and α are the polar diameter and polar angle of polar coordinate; and transforming the reconstructed image into logarithmic polar coordinates and obtaining 360-degree tiled image after the reconstructed image is transformed into logarithmic polar coordinates, thus obtaining the tiled and undistorted high-quality panoramic ghost imaging as shown in FIG. 5(b).

The logarithmic polar coordinate described in S3.2 essentially takes logarithm of the polar diameter r, that is $$\begin{cases} \rho = \log_\varepsilon(r) = \log_\varepsilon\left(\sqrt{x^2 + y^2}\right) \\ \theta = \arctan(y/x) \end{cases}, \quad (8)$$

where ρ and θ are the median radius and angle of logarithmic polar coordinates.

As shown in FIG. 2, the embodiment discloses an omnidirectional ghost imaging system based on the mechanism of bio-inspired retina-like, which is intended for realizing the omnidirectional ghost imaging system based on the mechanism of bio-inspired retina-like. The system comprises a projector 1, a collimating lens 2, a spectroscope 3, a curved mirror 4, a single pixel detector 5, a data acquisition card 6 and an upper computer 7.

The projector 1, the collimating lens 2, the spectroscope 3 and the curved mirror 4 are located on the same optical path in sequence; the required annular pattern sequence of bio-inspired retina-like according to S1 is input into the projector 1, and the light source of the projector 1 is modulated. The modulated light source is collimated by the collimating lens 2, and then projected onto the curved mirror 4 by the spectroscope 3. The light intensity reflected from the omnidirectional image projected on the surface of the curved mirror 4 is reflected by the spectroscope 3, and received by the single pixel detector 5, and the data acquisition card stores the data. After repeated measurements for many times, according to the reconstruction algorithm of S2, the upper computer 7 is used to calculate the correlation between the collected light intensity data and the annular pattern sequence of the bio-inspired retina-like, and a 360-degree omnidirectional image is reconstructed. Then, according to S3, the 360-degree omnidirectional image is converted into logarithmic polar coordinates, and the image is tiled and unfolded, so that an undistorted 360-degree omnidirectional ghost imaging target can be obtained.

The above detailed description further elaborates the objective, technical scheme and beneficial effects of the application. It should be understood that the above description is only a specific embodiment of the application, and is not used to limit the scope of protection of the application. Any modification, equivalent substitution, improvement, etc. made within the spirit and principle of the application should be included in the scope of protection of the application.

What is claimed is:

1. An omnidirectional ghost imaging method based on a mechanism of bio-inspired retina-like, comprising the following steps:
    S1: generating an annular pattern sequence of bio-inspired retina-like by utilizing logarithmic polar coordinate mapping characteristics of a bio-inspired retina-like structure;
    S2: utilizing the annular pattern sequence of bio-inspired retina-like to modulate a light source and making the modulated light illuminate curved mirror; after being reflected by a target around the curved mirror, the light being projected onto the curved mirror and diffusely reflected; according to the reversible characteristics of the optical path, the light after diffuse reflection being reflected to the original light source by the half mirror and half lens, and the reflected light intensity with target information being received by the bucket detector; the reflected light intensity measurement value with target information being correlated with the annular pattern sequence of bio-inspired retina-like used to modulate the light source, and the 360-degree omnidirectional image reconstructed, 360-degree omnidirectional ghost imaging; and
    S3: transforming the reconstructed image into logarithmic polar coordinates and obtaining 360-degree tiled image after the reconstructed image is transformed into logarithmic polar coordinates, and obtaining the tiled and undistorted high-quality panoramic ghost imaging according to the mapping characteristics of logarithmic polar coordinates of bio-inspired retina-like;

wherein the step S1 comprises:

S1.1: initializing the parameters used for generating the annular pattern of bio-inspired retina-like;

wherein the annular pattern of bio-inspired retina-like comprises the blind hole area of the central fovea and the imaging area, so an area within the radius $r_0$ of the outer ring of the blind area of the central fovea is defined as a blind area, and the area outside the radius $r_0$ is defined as an imaging area; according to the difference of polar diameter and polar angle, the imaging area is divided into P rings, each ring has Q pixels, and ε denotes the inter-ring growth coefficient; and S1.2: constructing the annular pattern model of bio-inspired retina-like, and generating the annular pattern sequence of bio-inspired retina-like;

wherein according to the parameters set in S1.1, a model of the annular pattern of bio-inspired retina-like is obtained as follows:

$$\begin{cases} r_p = r_1 \cdot \varepsilon^{p-1} \\ \varepsilon = \dfrac{1+\sin(\pi/Q)}{1-\sin(\pi/Q)} \\ r_1 = \dfrac{r_0}{1-\sin(\pi/Q)} \\ \theta_q = q \cdot \dfrac{2\pi}{Q} \quad (q=1,2,3 \ldots Q) \\ \xi_p = \log_\varepsilon(r_p) = \log_\varepsilon(r_1) + p - 1 \quad (p=1,2,3 \ldots P) \end{cases} \quad (1)$$

in which p and q represent the p-th ring and the q-th pixel respectively, $r_p$ represents the radius of the p-th ring of pattern and $\theta_q$ is the angle corresponding to the q-th pixel;

each pixel grid is filled with a pattern for modulating the light source, so as to generate the annular pattern sequence of bio-inspired retina-like;

wherein the step S2 comprises:

S2.1: modulating the light source by utilizing the annular pattern sequence of bio-inspired retina-like, and making the modulated light illuminate the curved mirror so as to completely cover the entire imaging field of view; the light being reflected by the target around the curved mirror, then projected onto the curved mirror and diffusely reflected; according to the reversible characteristics of the optical path, the light after diffuse reflection being reflected to the original light source by the half mirror and half lens, and the reflected light intensity with target information being received by a bucket detector; and S2.2: correlating the reflected light intensity measurement value with target information with the annular pattern sequence of bio-inspired retina-like for modulating the light source, and reconstructing the 360-degree omnidirectional image, 360-degree omnidirectional ghost imaging;

wherein the image resolution is set to M×N, and M×N pieces of annular pattern sequences bio-inspired retina-like is projected; the measured values detected by the detector are y={$y_1, y_2 \ldots y_{M\times N}$}, and the reconstructed 360-degree omnidirectional image is o (x,y) as follows:

$$o(x,y) = \dfrac{1}{M \times N} \sum_{i=1}^{M \times N} y_i k_i, \quad (2)$$

in which, $k_i$ represents the projected i-th pattern, and $y_i$ represents the measured light intensity obtained by projecting the i-th pattern;

the reflected light intensity measurement value with target information and the annular pattern sequence of the bio-inspired retina-like used for modulating the light source are correlated and calculated according to the reconstruction algorithm shown in formula (2), so that the 360-degree omnidirectional image is reconstructed, 360-degree omnidirectional ghost imaging.

2. The omnidirectional ghost imaging method based on the mechanism of bio-inspired retina-like according to claim 1, wherein the step S3 comprises:

S3.1: converting the 360-degree omnidirectional image reconstructed in S2 from Cartesian coordinates to polar coordinates;

wherein the coordinate of a certain point in Cartesian coordinates is defined as (x,y), denotated as (r,α) in polar coordinates, which is calculated out by Cartesian coordinates as follows:

$$\begin{cases} r = \sqrt{x^2+y^2}, \\ \alpha = \arctan(y/x) \end{cases} \quad (3)$$

where r and α are the polar diameter and polar angle of polar coordinate; and

S3.2: transforming the reconstructed image into logarithmic polar coordinates from polar coordinates and obtaining 360-degree tiled image after the reconstructed image is transformed into logarithmic polar coordinates, and obtaining the tiled and undistorted high-quality panoramic ghost imaging;

wherein the logarithmic polar coordinate described in step S3.2 essentially takes logarithm of the polar diameter r as follows:

$$\begin{cases} \rho = \log_\varepsilon(r) = \log_\varepsilon\left(\sqrt{x^2+y^2}\right), \\ \theta = \arctan(y/x) \end{cases} \quad (4)$$

where ρ and θ are the median radius and angle of logarithmic polar coordinates, and the base is the inter-ring growth coefficient.

3. An omnidirectional ghost imaging system based on a mechanism of bio-inspired retina-like for realizing the omnidirectional ghost imaging method based on the mechanism of bio-inspired retina-like according to claim 1, comprising a projection system, a collimating lens, a spectroscope, a curved mirror, a bucket detector, a data acquisition card and an arithmetic system;

wherein the projection system, the collimating lens, the spectroscope and the curved mirror are located on the same optical path in sequence, and the light source of the projection system is modulated by the annular pattern sequence of bio-inspired retina-like, collimated by the collimating lens, and then projected onto the curved mirror through the spectroscope; the light intensity reflected from the mirror is reflected by the spectroscope, received by the bucket detector, and stored in the data acquisition card to collect the total light intensity information of the whole omnidirectional target; the arithmetic system is used to reconstruct the 360-degree omnidirectional image and perform data operation and processing of logarithmic polar coordinate transformation on the 360-degree omnidirectional image.

4. The omnidirectional ghost imaging system based on the mechanism of bio-inspired retina-like according to claim 3, wherein a working method of the omnidirectional ghost imaging system comprises the following steps:

inputting the required annular pattern sequence of bio-inspired retina-like generated into the projection system, and modulating the light source of the projection system; collimating the modulated light source with the collimating lens, and then projecting the modulated light source onto the curved mirror by the spectroscope; reflecting the light intensity by the spectroscope reflected by the omnidirectional image projected on the surface of the mirror, and receiving by the bucket detector, and storing the data by the data acquisition card; after repeated measurements, performing correlation calculation, and reconstructing a 360-degree omnidirectional image; after that, getting the 360-degree omnidirectional image be subjected to logarithmic polar coordinates transformation, and tiling and unfolding the image, thus obtaining the undistorted 360-degree omnidirectional ghost imaging target.

* * * * *